(12) United States Patent
Seeley

(10) Patent No.: US 7,156,560 B2
(45) Date of Patent: Jan. 2, 2007

(54) OPTIC FIBER ALIGNMENT RETAINER ASSEMBLY

(75) Inventor: Gregory Alan Seeley, Orange, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 112 days.

(21) Appl. No.: 11/128,719

(22) Filed: May 13, 2005

(65) Prior Publication Data

US 2006/0257076 A1 Nov. 16, 2006

(51) Int. Cl.
*G02B 6/36* (2006.01)
(52) U.S. Cl. .......................... 385/59; 385/60; 385/71; 385/72
(58) Field of Classification Search ............... None
See application file for complete search history.

(56) References Cited

U.S. PATENT DOCUMENTS

| | | | | |
|---|---|---|---|---|
| 2,135,267 A * | 11/1938 | Alden | ........................ | 439/379 |
| 4,076,379 A * | 2/1978 | Chouinard | ................... | 385/73 |
| 4,088,390 A * | 5/1978 | McCartney | ................. | 385/62 |
| 4,182,546 A * | 1/1980 | Lukas et al. | .................. | 385/59 |
| 5,265,182 A * | 11/1993 | Hartley | ........................ | 385/77 |
| 5,386,486 A * | 1/1995 | Fan et al. | ..................... | 385/59 |
| 6,394,661 B1 * | 5/2002 | Cull et al. | .................... | 385/59 |
| 6,530,801 B1 * | 3/2003 | Bates et al. | ................. | 439/364 |

* cited by examiner

*Primary Examiner*—Rodney Bovernick
*Assistant Examiner*—Mike Stahl
(74) *Attorney, Agent, or Firm*—Peter Van Winkle

(57) ABSTRACT

An alignment assembly (20) is provided for holding alignment sleeves that each aligns the ends of a pair of optic fiber ferrules (22, 26) projecting from two mating connectors (12, 14), which assures that the mating connectors will always be mated in their proper relative orientations to avoid unacceptable insertion losses and the connection of the wrong pairs of fibers. The alignment assembly includes a housing (34) formed by two identical housing halves, and includes two identical locating pins (40, 42) mounted on the housing at opposite sides of the housing axis, each pin having having a pin end (91–94) projecting from each face of the housing. One pin has a large diameter end (94) projecting from a front housing face (100) into a large diameter locating hole (52) in a connector and the other pin has a small diameter end (93) projecting from the same front housing face into a small locating hole (51), to assure proper orientation of the two mating connectors.

9 Claims, 2 Drawing Sheets

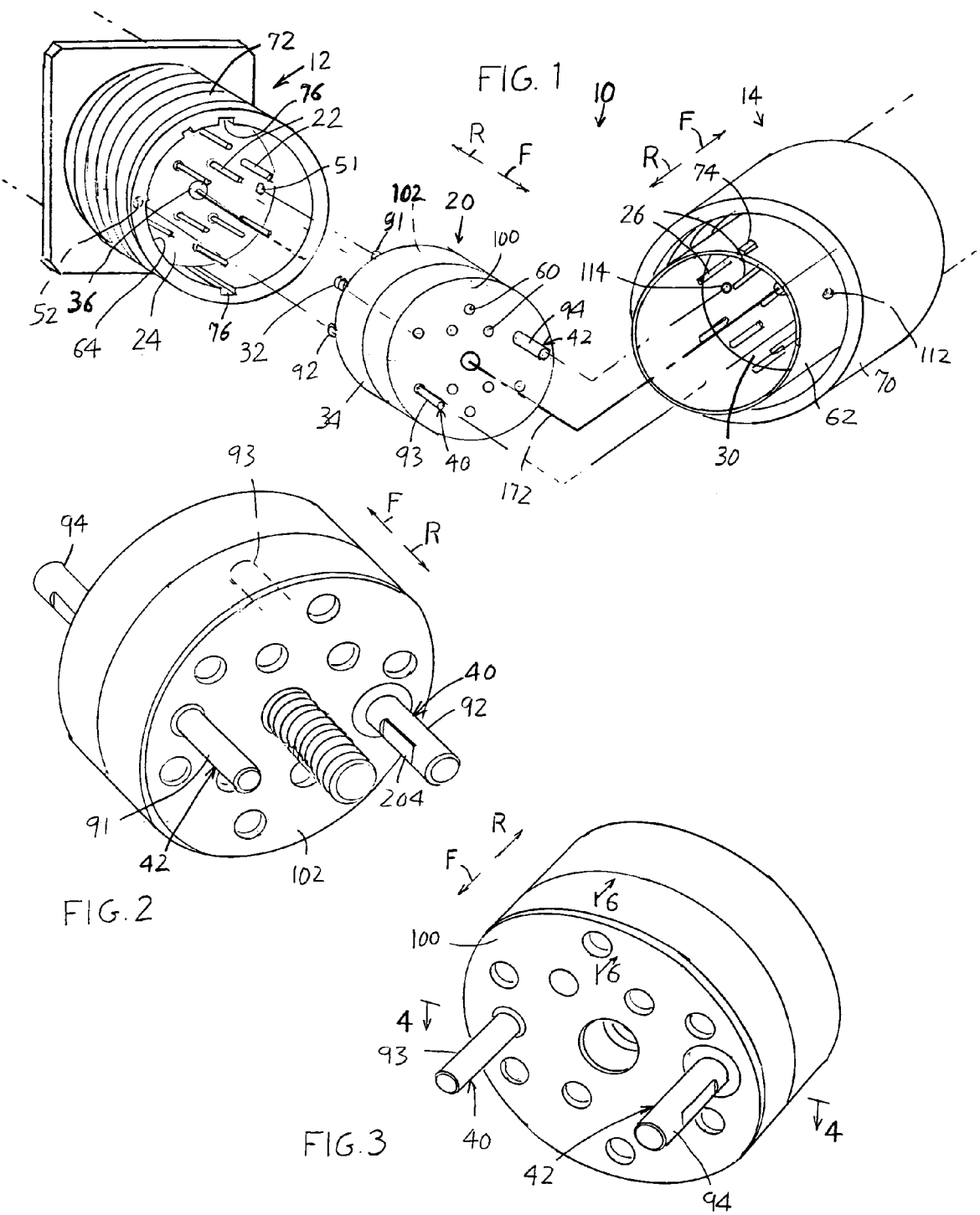

OPTIC FIBER ALIGNMENT RETAINER ASSEMBLY

BACKGROUND OF THE INVENTION

The ends of optic fibers are commonly installed in ferrules, with the fiber tips lying flush with the ferrule tips. Two ferrules are mated by inserting each ferrule into a precision alignment sleeve which aligns the ferrule tips to assure that light passes from one fiber tip to the other with minimum insertion loss (loss of light intensity). A pair of optic fiber connectors that each has a plurality of fiber-holding ferrules, can be connected by the use of a separate alignment assembly which includes a housing that holds a plurality of alignment sleeves. The alignment assembly is attached to a first one of the connectors as by a screw. The two connectors are brought together and held together as by a nut. The ferrules are chosen or adjusted to assure an insertion loss of no more than a preset level, such as 0.25 db for a single mode fiber, at each pair of mating ferrules.

Occasionally, a technician must gain access to the ferrule tips, as to clean them or to replace a poor-performing fiber and its associated ferrule. Such access is obtained by separating the connectors and then removing the alignment assembly to expose the ferrule tips. When the ferrule and fiber tips have been cleaned or a ferule is replaced, the alignment assembly is reinstalled in the first connector. When the alignment assembly is reinstalled and the two connectors are mated, it often is found that at least one of the pairs of mating ferrules experiences an insertion loss that is higher than is acceptable. This is because the two connectors may be mated in either of two orientations, and only one of the orientations provides the required low insertion loss for each fiber. Also, a change in orientation can result in mating of fibers that are not intended to be mated. Such improper orientation of the two connectors can be corrected by pulling apart the two connectors, turning one of them 180°, and reconnecting them, but this is annoying and time consuming. An alignment assembly which assured proper orientations of the two mating connectors after they have been unmated and remated and which added very little cost, would be of value.

SUMMARY OF THE INVENTION

In accordance with one embodiment of the invention, applicant provides a connection system that includes a pair of connectors and an alignment assembly, which assures that the connectors will mate only in one relative orientation of the connectors. Each connector has a plurality of ferrules that surround the ends of optic fibers. The alignment assembly includes a housing with opposite faces, that holds a plurality of precision alignment sleeves that each assures that a pair of mating ferrules are precisely aligned. The alignment assembly also includes a pair of locating pins with pin ends that project from each face of the housing. The two pin ends projecting from each housing face are of different diameters and project closely into locating holes of a connector that are of different locating hole diameters. This arrangement assures that two connectors mate only in one relative orientation.

The housing of the alignment assembly is formed of two identical housing halves, and the two locating pins are identical. Each housing half has two pin-receiving holes on opposite sides of the housing axis. One of the pin-receiving holes is threaded and the other hole has hole sections of different diameters to form a shoulder. This allows the two pins to be installed in reverse orientations in the two holes. The opposite ends of each pin are of different diameters. This results in large and small diameter pin ends projecting from each housing face.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a connector system of the present invention.

FIG. 2 is an isometric view of the alignment assembly of the system of FIG. 1, showing the rear face of the alignment assembly.

FIG. 3 is an isometric view of the alignment assembly of FIG. 2, showing the front face thereof.

DESCRIPTION OF THE PREFERRED EMBODIMENT

Figure 4:
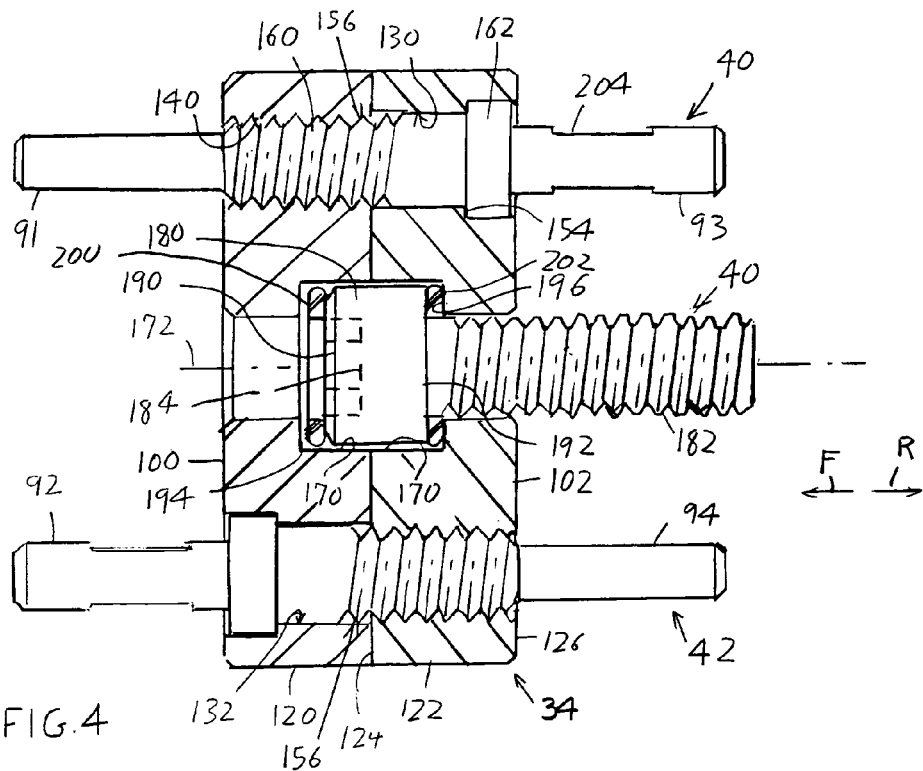
FIG. 4 is a sectional view of the alignment assembly of the assembly of FIG. 3, taken on line 4—4 thereof.

FIG. 1 shows a connector system 10 which includes receptacle and plug optic fiber connectors 12, 14 and an alignment sleeve retainer assembly, or alignment assembly 20. The receptacle connector 12 has ten ferrules 22 projecting in a forward F direction from a front surface of a receptacle connector body 24 that holds the ferrules (and that may have springs that bias them forwardly). The plug connector 14 also has ten ferrules 26 projecting rearwardly R from a plug connector body 30. To fully assemble the system, the alignment assembly 20 is mounted on one of the connectors, such as the receptacle connector 12. A jackscrew 32 projecting from a rear face 100 of the alignment assembly housing 34 is screwed into a threaded hole 36 in the body 24 of the receptacle connector to mount the alignment assembly on the receptacle connector. During such mounting, the rear ends 91, 92 of a pair of locating pins 40, 42 of the alignment assembly, move into location holes 51, 52 in the receptacle connector body. During such movement, the ferrules 22 move into alignment sleeves that lie in passages 60 in the housing.

After the alignment assembly 20 is installed on the receptacle connector 12, the plug connector 14 is advanced rearwardly R. A sleeve 62 of the plug connector enters the receptacle by sliding into a cylindrical recess 64 at the front of the receptacle connector. Finally, an internally threaded nut 70 on the plug connector screws onto an externally threaded shell 72 of the receptacle connector. The plug connector sleeve 62 may have at least one main key 74 that fits into a slot 76 of the receptacle connector, although this is not necessary. This type of cylindrical receptacle and plug connector pair is widely used in the optic fiber connector field.

Figure 6:
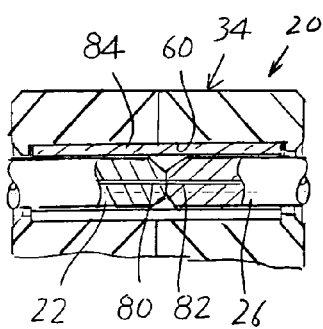
FIG. 6 is a partial sectional view of the alignment assembly of FIG. 3, taken on line 6—6 thereof, and showing a pair of optic fiber ferrules that are mated in an alignment sleeve.

With the connectors fully mated, the tips of each pair of ferrules 22, 26 abut one another. FIG. 6 shows an alignment sleeve 84 lying in an alignment passage 60 in the alignment housing 34, and a pair of mating optic fibers 80, 82 lying in the ferrules 22, 26. The figure shows the tips of the ferules (and of the fibers) abutting one another. The alignment sleeve 84 that lies in each alignment passage 60, precisely aligns the two mating ferrules.

The plug connector sleeve 62 (FIG. 1) fits loosely in the receptacle connector recess 64. To achieve closer alignment, the pins of the alignment assembly are provided with projecting pin ends 91, 92, 93, and 94 (FIGS. 2 and 3) that project from the front and rear faces 100, 102 of the housing 34. The rear pin ends 91, 92 fit closely into the locating holes 51, 52 (FIG. 1) in the receptacle connector body. The front pin ends 93, 94 fit closely into locating holes 112, 114 in the plug connector body.

As mentioned earlier herein, technicians sometimes require direct physical access to the ferrules 22, 26 (FIG. 6) of the receptacle and plug connectors 12, 14, especially to clean the ferrule tips. Such access is achieved by disconnecting the connectors and removing the alignment assembly 20 from the receptacle connector (or from the plug connector if the assembly is mounted thereon). In the prior art, if the connectors were reassembled with one connector turned 180° from its original position before disassembly, then there was a possibility that one or more pairs of ferrules would experience an excessive insertion loss, such as more than a 0.25 db insertion loss. Also, ferrules of one connector could be mated to the wrong ferrules of the other connector. To prevent this, applicant constructs the pins so the two rear pin ends 91, 92 (FIG. 1) that project from the assembly housing rear face are of different diameters, and the two front pin ends 93, 94 are also of different diameters. Also, the locating holes in each of the two connectors are constructed of different diameters to closely receive the different pin ends. The different size location holes can be easily achieved in existing connectors by drilling one location hole in each connector to slightly enlarge it.

Figure 5:
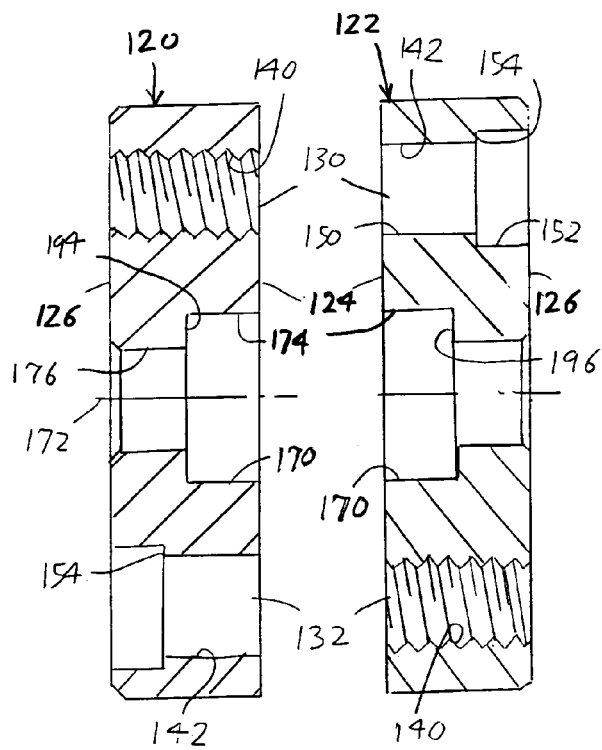
FIG. 5 is an exploded sectional view of only the housing halves of the alignment assembly of FIG. 4.

FIGS. 4 and 5 show the construction of the alignment assembly. The housing 34 is formed of two housing halves 120, 122 that are of substantially identical construction (i.e. any differences do not affect the ability to hold the two pins and the jackscrew in the manner shown). Each housing half has inner and outer surfaces 124, 126, and the housing halves are held together with their inner faces lying facewise adjacent so they lie against one another (with possibly a thin layer between them). The housing forms two pin-receiving through borehole 130, 132. Each housing half has a first bore 140 that is threaded, and a second bore 142 that is preferably unthreaded. The second bore 142 has an inner region 150 of larger diameter than the maximum diameter of the threaded bore, and the second bore has an outer region 152 of even greater diameter than the inner region. The two second bore regions 150, 152 form an outwardly facing shoulder 154.

FIG. 4 shows that the two pins 40, 42 of the alignment assembly have mount portions 156 that are each mounted and fixedly fastened in a different one of the two boreholes 130, 132. The first pin 40 has a threaded shank part 160 that has been inserted forwardly F into the borehole 130 and turned to threadably engage the threaded bore 140 until an enlargement 162 on the pin has engaged the shoulder 154. The second pin 42 has been inserted in an orientation that is turned 180° from the first pin, so the second pin has been inserted rearwardly R (and turned to thread it in place) into the second borehole 132. When the pins have been fully inserted, one large diameter pin end 92, 93 projects from each housing face 100, 102, and one smaller diameter pin end 91, 93 projects from each housing face.

The housing halves 120, 122 (FIG. 5) each have a jackscrew through hole part 170 extending along the axis 172 of the alignment assembly. Each hole part 170 has a large diameter inner end 174 and a smaller diameter outer end 176. The jackscrew 40 (FIG. 4) has a head 180 that fits in the large hole parts and has a threaded shank 182 that passes though one of the smaller diameter outer hole parts 176 and that projects beyond one face 102 of the housing. The jackscrew head has a noncircular recess 184 that receives a turning tool such as a hexagonal or Allen wrench to turn the jackscrew.

Applicant find that the opposite ends 190, 192 of the jackscrew head can gall shoulders 194, 196 formed in the hole parts. To prevent such galling, applicant provides washers 200, 202 that lie against the front and rear ends of the jackscrew heads.

In a connector assembly for a type 38999 cylindrical optic fiber connector of the type illustrated that applicant has constructed and successfully tested, the large diameter pin ends 92, 93 each had a diameter of 0.078 inch (2 mm), while the small diameter ends 91, 94 each had a diameter of 0.062 inch (1.57 mm). Each large diameter pin end was constructed with two flat spots 204 so a wrench could easily turn the pin during installation. The small diameter pin ends are of the same diameter as those of prior alignment assembly pins, but the larger diameter ends are larger. This allows modification of a connector by drilling only one of its body holes to slightly enlarge it. There is a clearance of only about one thousandth inch between each pin end and a corresponding pin-receiving bore in a connector.

It is possible to change the alignment so one connector must be turned 180° from its original orientation in FIG. 1 in order for the connectors to mate. This can be done by using different alignment pins, one with opposite ends that are both of a large diameter and the other pin with opposite ends that are both of a small diameter (at least 0.1 mm smaller in diameter). It is possible to use more than two pins, but even with three pins spaced 120° apart, every two of such pins lie at primarily opposite sides of the axis.

Thus, the invention provides a connector system of a type that includes an alignment assembly that lies between two optic fiber connectors to hold alignment sleeves, wherein the alignment assembly and preferably the connectors, are constructed to assure that the connectors are always mated in the same orientation about a system axis using an alignment assembly of simple and low cost construction and with minimum changes to the connectors. The alignment assembly includes two locating pins with projecting pin ends projecting beyond each of the two opposite faces of the alignment housing. One projecting pin end at each face is a smaller diameter pin end and the other is a large diameter pin end. The alignment assembly housing is formed by two identical housing halves having flat inner end faces lying facewise adjacent and against each other. Each housing half has a different pin-receiving hole at opposite sides of its axis. The assembly also includes two identical pins, each installed in a reverse orientation in the different holes, so one large diameter pin end and one small diameter pin end project from each housing face.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A connector system that aligns optic fiber ferrules of two optic fiber connectors that each has a pair of locating holes, which includes an alignment assembly that has an alignment housing with front and rear faces, said alignment housing having a plurality of sleeve-holding passages and an alignment sleeve in each passage for receiving the ends of two of said ferrules, said alignment housing having a plurality of pin-holding bores including first and second bores, and said alignment assembly including a plurality of alignment pins each having a mount portion mounted in one of said pin-holding bores and each having opposite pin ends projecting respectively from said housing front and rear faces for reception in said locating holes of said connectors, wherein:

the locating holes of each connector include a large diameter locating hole and a small diameter locating hole;

first and second of said pins are installed, with a large diameter pin end and a small diameter pin end projecting from said front face of said housing and with a large diameter pin end and a small diameter pin end projecting from said rear face of said housing, said large diameter pin ends being closely receivable in said large diameter locating holes and said small diameter pin ends closely receivable in said small diameter locating holes.

2. The system described in claim 1 wherein:

said alignment housing includes first and second housing halves that each forms first and second bore parts of said first and second bores, respectively and that each has inner and outer faces with the inner face of the first and second housing halves lying facewise adjacent to each other and with the outer faces facing away from each other;

the first bore part of each housing half being threaded and the second bore part of each housing half forming an outwardly-facing shoulder within the second bore part, said housing halves being positioned with one threaded first bore part of one housing half being aligned with one shoulder-forming second bore part of the other housing half;

said alignment pins each has a threaded pin part that lies in one of said threaded first bore parts and each has an enlargement that lies in second bore parts and against the shoulder therein, to thereby hold said housing halves together.

3. The system described in claim 2 wherein:

said first and second housing halves are identical and said first and second pins are identical, each pin having opposite ends with one end forming one of said large diameter pin ends and the other end of the same pin forming one of said small diameter ends.

4. The system described in claim 1 wherein, at least one of said optic fiber connectors has a central threaded hole, and wherein:

said alignment housing includes first and second housing halves that each has an axis and that each has inner and outer faces;

each of said housing halves has a screw-receiving hole lying on said axis, each screw-receiving hole having an inner end with a large diameter hole portion and an outer end with a smaller diameter hole portion forming an inwardly-facing shoulder at the intersection of said hole portions;

a jackscrew which has a head of about the same diameter as said large diameter hole portions and which has a threaded shank;

said housing halves being positioned with their inner faces lying facewise adjacent to each other, with said large diameter hole portions aligned and facing each other, and with said jackscrew head lying in the large diameter hole portions of said housing halves, the threaded shank of the jackscrew projecting through and beyond the smaller diameter hole of one of said housing halves and into said central threaded hole of one of said connectors.

5. The alignment assembly described in claim 4 wherein:

said jackscrew head has opposite head ends;

a pair of washers each lying between one of said ends of said screw head and one of said inwardly-facing shoulders.

6. A connector system that aligns the optic fiber ferrules of two optic fiber connectors that each has a pair of locating holes, which includes an alignment housing with an axis and with front and rear faces, said housing having a plurality of sleeve-holding passages each extending between said faces, said housing including a plurality of alignment sleeves each captured in one of said passages for receiving and aligning the ends of two of said ferrules, said housing having an axis and having a plurality of pin-holding bores including first and second bores, and said assembly including a plurality of alignment pins each having a mount portion mounted in one of said bores and each having parallel opposite ends projecting respectively from said housing front and rear faces for reception in said pin-receiving holes of said connectors, wherein:

said alignment housing comprises two substantially identical housing halves, each housing half having inner and outer faces and said housing halves lying with their inner faces substantially against each other;

each housing half has an axial hole portion lying on said axis and a pair of bore portions on primarily opposite sides of said axis, one bore portion being threaded and the other bore portion having an inner bore part of larger diameter than the maximum diameter of said threads and an outer bore part of larger diameter than said inner bore part and forming an outwardly-facing shoulder at the intersection of said inner and outer bore parts;

a pair of substantially identical alignment pins each extending through one of said pin-holding bores, each alignment pin having one end of a first diameter projecting beyond one of said housing faces and having an opposite end of a second diameter that is larger than said first diameter and that projects beyond the other one of said housing faces;

each of said pins having a threaded part that is threadably engaged with one of said threaded bore portions and each of said pins has an enlarged part that engages one of said shoulders;

a first end of one of said pair of alignment pins projects beyond said front face and a second end of the other pin of said pair of alignment pins projects beyond said front face.

7. The system described in claim 6 wherein a first of said optic fiber connectors has a threaded connection hole;

the axial hole portion of each of said housing halves has a large diameter inner hole part extending from the inner face of the housing half and has a smaller diameter outer hole part extending from an outer end of the inner hole part to the outer face of the housing half, said hole parts forming an inwardly-facing shoulder at their intersection;

a jackscrew with a head lying in both of said large diameter inner hole parts and with a threaded shank extending through one of said outer hole parts and threadably engaged with the threaded connection hole of said first optic fiber connector.

8. The system described in claim 7 wherein:

said jackscrew head has opposite head ends and including;

a pair of washers each lying between one of said ends of said screw head and one of said inwardly-facing shoulders.

9. A connector system comprising:

receptacle and plug connectors that each has a set of ferrules projecting toward each other and that each has a body with at least two locating holes including small diameter locating holes and larger large diameter locating holes;

an alignment assembly that includes a housing formed by a pair of identical housing halves having coincident axes and having flat inner surfaces lying against each other and outer surfaces, each housing half having holes on primarily opposite sides of its axis including a first hole that is threaded and a second hole with an inner hole part of larger diameter than the threaded hole and with an outer hole part of larger diameter than the inner hole part and forming an outwardly facing shoulder, the first hole of each housing half aligned with the second hole of the other housing half;

a pair of identical alignment pins each having ends of different diameters, each pin having a threaded part lying in the threaded hole of one housing half and having a nonthreaded part with an enlargement lying in one of said second holes and with the enlargement abutting one of said shoulders;

each smaller diameter pin end lying in one of said small diameter locating holes and each larger diameter pin end lying in one of said large diameter locating holes, said smaller and larger pin ends being of diameters to fit closely in said small and large diameter locating holes.

* * * * *